(12) United States Patent
Zou et al.

(10) Patent No.: US 8,656,734 B2
(45) Date of Patent: Feb. 25, 2014

(54) MATERIAL FOR INFORMATION RECORDING MEDIUM SUBSTRATE, INFORMATION RECORDING MEDIUM SUBSTRATE, INFORMATION RECORDING MEDIUM, AND METHOD FOR MANUFACTURING THEM

(75) Inventors: Xuelu Zou, Shinjuku-ku (JP); Yoichi Hachitani, Shinjuku-ku (JP); Kazuo Tachiwana, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 443 days.

(21) Appl. No.: 12/522,062

(22) PCT Filed: Jan. 8, 2008

(86) PCT No.: PCT/JP2008/050049
§ 371 (c)(1),
(2), (4) Date: Sep. 29, 2009

(87) PCT Pub. No.: WO2008/084779
PCT Pub. Date: Jul. 17, 2008

(65) Prior Publication Data
US 2010/0011814 A1    Jan. 21, 2010

(30) Foreign Application Priority Data

Jan. 10, 2007  (JP) ................................ 2007-002151

(51) Int. Cl.
*C03B 11/00*  (2006.01)
(52) U.S. Cl.
USPC .............. 65/29.14; 65/99.5; 65/66; 65/30.14; 65/122
(58) Field of Classification Search
USPC ........................ 65/29.14, 90, 99.1, 99.4, 99.5
See application file for complete search history.

(56) References Cited

U.S. PATENT DOCUMENTS

| | | | | |
|---|---|---|---|---|
| 3,819,347 | A | * | 6/1974 | Callies et al. ................ 65/29.21 |
| 5,928,793 | A | * | 7/1999 | Kimura ........................ 428/428 |
| 2003/0074921 | A1 | | 4/2003 | Ogino et al. |
| 2005/0079391 | A1 | | 4/2005 | Ikenishi et al. |
| 2009/0056788 | A1 | * | 3/2009 | Gibson ........................ 136/246 |

FOREIGN PATENT DOCUMENTS

| | | |
|---|---|---|
| JP | 2001-076336 A | 3/2001 |
| JP | 2003-137557 A | 5/2003 |
| JP | 2004-288228 A | 10/2004 |
| JP | 2006099857 A * | 4/2006 |

OTHER PUBLICATIONS

Machine Translation, JP2006-099857, Manufacturing Method of Glass Substrate, Apr. 13, 2006.*

* cited by examiner

*Primary Examiner* — Matthew Daniels
*Assistant Examiner* — Lisa Herring
(74) *Attorney, Agent, or Firm* — Sughrue Mion, PLLC

(57) ABSTRACT

A method for manufacturing a disklike glass material comprising the successive molding of multiple pieces of disklike glass material from glass melt. Being suppressed variation over time in the concentration of infrared radiation-absorbing ions contained in the glass melt being molded into the pieces of disklike glass material so that the variation in the sheet thickness of the multiple pieces of disklike glass material falls within a range of ±15 percent of a reference value. The reference value being the median between the maximum value and the minimum value of the sheet thickness of 1,000 pieces of the glass material. In the course of molding multiple pieces of disklike glass material comprised of glass containing 0.1 to 100 ppm of infrared radiation-absorbing ions, vaiiation over time in the concentration of the infrared radiation-absorbing contained in the glass melt is suppressed to suppress variation in the sheet thickness of the multiple pieces of sheet like glass material.

12 Claims, No Drawings

MATERIAL FOR INFORMATION RECORDING MEDIUM SUBSTRATE, INFORMATION RECORDING MEDIUM SUBSTRATE, INFORMATION RECORDING MEDIUM, AND METHOD FOR MANUFACTURING THEM

CROSS-REFERENCE TO RELATED APPLICATIONS

This application claims benefit of priority to Japanese Patent Application No. 2007-2151 filed on Jan. 10, 2007, which is expressly incorporated herein by reference in its entirety.

TECHNICAL FIELD

The present invention relates to a method for manufacturing a disklike glass material comprised of a glass-based substance, particularly an information recording medium substrate-use glass material; a method for manufacturing an information recording medium-use substrate from this material; and a method for manufacturing an information recording medium using this substrate.

BACKGROUND ART

Materials such as glass, crystallized glass, and aluminum are employed in the substrates of information recording media such as the magnetic disks loaded in personal computers, portable digital audio equipment, and car navigation systems. Of these, glass-based materials such as glass and crystallized glass afford the advantages of good resistance to shock and better heat resistance than aluminum. They also afford adequate strength even when fashioned into thin sheets.

Methods of manufacturing information recording medium-use glass substrates include, for example, as described in Patent Reference 1, the method of melting a glass starting material by heating, feeding the glass melt obtained into a pressing mold, conducting pressing to mold a disklike material, and processing this material. There is also a method in which, instead of press molding, the glass melt is fashioned into sheets by a method known as floating and the sheetlike material obtained is then processed. Molding into sheets by floating is described, for example, in Patent Reference 2. A method of processing a sheetlike material is described in Patent Reference 3.

Methods of manufacturing crystallized glass substrates for information recording media, as described in Patent Reference 4, for example, include the method of press molding a glass melt, heat treating the material obtained to induce crystallization, and then processing it into a finished substrate.

[Patent Reference 1] Japanese Unexamined Patent Publication (KOKAI) Heisei No. 10-236831 or see English language family member U.S. Pat. No. 6,442,975

[Patent Reference 2] Japanese Examined Patent Publication (KOKOKU) Heisei No. 5-50446

[Patent Reference 3] Japanese Unexamined Patent Publication (KOKAI) No. 2006-99857

[Patent Reference 4] Japanese Unexamined Patent Publication (KOKAI) No. 2001-184624 or English language family member U.S. Pat. No. 6,426,311

Patent References 1-4 are expressly incorporated herein by reference in their entirety.

In recent years, the demand for thin information recording medium-use substrates has increased as the size of magnetic recording media has diminished. In the course of manufacturing substrates of constant thickness as set forth above, the production of materials without variation in sheet thickness is anticipated, since it suffices to render the thickness of the glass material uniform prior to processing.

The effect of variation in the sheet thickness increases as the glass substrate becomes thinner. Accordingly, as the substrate becomes increasingly thin, there is a need to reduce variation in the sheet thickness of the material to efficiently produce substrates with high precision from blank materials. Meeting this need requires thinly extending the glass to a constant thickness while it is in a molten state.

However, as molten glass is extended, the surface area per unit of volume increases and the thermal energy escaping through the surface increases sharply. Thus, the viscosity rises sharply, hampering extension. When molding a material from glass melt, in both the above-described pressing method and floating method, achieving a thin sheet requires the optimization of molding conditions such as the outflow temperature of the glass melt, the temperature distribution of the pressing mold, the pressure and timing of pressing, the temperature of the float bath, and the ambient temperature. These optimized conditions must also be maintained.

Even when these conditions are maintained constant, there are times when the sheet thickness of the material varies. As the sheets have become thinner, cases have arisen in which the variation in sheet thickness cannot be ignored. However, some of the reasons for which the sheet thickness of the material varies even when the above conditions are kept constant are unknown and have not been explored.

The present invention has for its objects to provide a method for manufacturing a disklike glass material for the mass production of information recording media substrate-use materials of constant sheet thickness, to provide a method for manufacturing an information recording medium-use substrate from the material thus manufactured, and to provide a method for manufacturing an information recording medium.

DISCLOSURE OF THE INVENTION

Means of Solving the Problem

The present inventors examined the reasons for variation in the sheet thickness of materials in which the above-stated conditions were kept constant. As a result, they determined that variation in the concentration of infrared radiation-absorbing ions contained in the glass material is one cause of the variation in sheet thickness of the material. They also discovered that by suppressing variation in the concentration of infrared radiation-absorbing ions contained in the glass material, it was possible to solve the above-stated problem. The present invention was devised on this basis.

The present invention is as follows:

[1] A method for manufacturing a disklike glass material comprising the successive molding of multiple pieces of disklike glass material from glass melt, characterized by:
suppressing variation over time in the concentration of infrared radiation-absorbing ions contained in the glass melt being molded into said pieces of disklike glass material so that the variation in the sheet thickness of said multiple pieces of disklike glass material falls within a range of ±15 percent of a reference value (said reference value being the median between the maximum value and the minimum value of the sheet thickness of 1,000 pieces of said glass material).

[2] The method for manufacturing according to [1], wherein the content of said infrared radiation-absorbing ions in said glass material is 0.1 to 100 ppm.

[3] A method for manufacturing a disklike glass material comprising the successive molding of multiple pieces of disklike glass material from glass melt, characterized by:

in the course of molding multiple pieces of disklike glass material comprised of glass containing 0.1 to 100 ppm of infrared radiation-absorbing ions, variation over time in the concentration of the infrared radiation-absorbing ions contained in the glass melt being molded into said pieces of disklike glass material is suppressed to suppress variation in the sheet thickness of said multiple pieces of sheetlike glass material.

[4] The method for manufacturing according to any one of [1] to [3], wherein said infrared radiation-absorbing ions are the ions of one or more metals selected from the group consisting of Fe, Cu, and Cr.

[5] The method for manufacturing according to any one of [1] to [4] wherein the sheet thickness of said disklike glass material is from 0.5 to 1.5 mm.

[6] The method for manufacturing according to any one of [1] to [5] wherein the molding of said glass melt into disklike glass materials comprises the step of press molding glass melt to obtain a disklike glass material.

[7] The method for manufacturing according to any one of [1] to [5] wherein the molding of said glass melt into disklike glass materials comprises:

the step of obtaining a beltlike glass material from glass melt by the float method; and the step of mechanically processing said beltlike glass material to obtain a disklike glass material.

[8] The method for manufacturing according to any one of [1] to [7] wherein said glass material is heat treated to obtain a glass material comprised of crystallized glass.

[9] The method for manufacturing according to any one of [1] to [8] wherein said disklike glass material is an information recording medium substrate-use material.

[10] A method for manufacturing an information recording medium-use glass substrate, characterized by:

forming a hole in the center of a disklike glass material obtained by the method according to any one of [1] to [8];

processing the inner and outer perimeters thereof; and grinding and/or polishing the main surfaces thereof to obtain an information recording medium-use glass substrate.

[11] A method for manufacturing an information recording medium comprising the step of forming an information recording layer on a glass substrate obtained by the method according to [10].

EFFECT OF THE INVENTION

The present invention provides a method for manufacturing a disklike glass material suited to use as an information recording medium substrate-use material for the mass production of sheetlike information recording medium substrate-use materials of constant thickness, a method for manufacturing an information recording medium-use substrate from the material thus manufactured, and a method for manufacturing an information recording medium.

BEST MODE OF IMPLEMENTING THE INVENTION

The present invention is a method for manufacturing a disklike glass material comprising successively molding multiple pieces of disklike glass material from glass melt.

In the method for manufacturing a disklike glass material comprising the successive molding of multiple pieces of disklike glass material, the press molding method described in Patent Reference 1 or the floating method described in Patent Reference 2 can be employed as is.

For example, in press molding, as represented by the method described in Patent Reference 1, glass melt is fed between a lower mold and an upper mold opposed to the lower mold, and the glass melt is press molded to form disklike glass. In this method, disklike glass is obtained by press molding with a lower mold and an upper mold that are maintained at a prescribed temperature. While the interior of the disklike glass is at a temperature higher than the glass transition temperature, the upper mold is separated from the disklike glass to complete press molding. Next, a step can be conducted to reduce the warp of the disklike glass that has been molded by press molding. The step to reduce the warp is desirably completed while the interior of the disklike glass is at a temperature higher than the glass transition temperature. From the perspective of reducing the pressing time, press molding and pressing to remove the warp are desirably completed at a temperature higher than the softening point of the glass. The temperature at which the warp of the glass is reduced is desirably lower than the press molding temperature. Since the various pressing is completed at temperatures that are higher than the glass transition temperature and glass softening point, the glass at the end of the press molding basically retains a shape corresponding to the molding surfaces of the mold even after separation from the mold, while being in a state permitting microdeformation by external forces.

The time required for press molding is desirably not greater than 2 seconds, preferably not greater than 1.8 seconds. The above-mentioned interior of the glass refers to the main portion of the glass that is covered by an outer layer portion of glass where marked release of heat occurs. The temperature of the interior of the glass affects shape retention and shape deformation properties.

In the floating method, as represented by the method described in Patent Reference 2, glass melt that has been clarified by heating is fed into a float bath to mold a beltlike glass material (glass ribbon) of prescribed thickness. After being molded into a beltlike glass material, this material is mechanically processed to obtain a disklike glass material. Specifically, the mechanical processing comprises milling, grinding, and polishing. A disklike glass material is obtained through these steps. In the present invention, the thickness of the beltlike glass is rendered constant and disks are cut out of the beltlike glass.

In the present invention, the term "disklike glass material" refers to a disklike glass material suitable for use as a substrate, as represented by a magnetic disk-use glass substrate. For example, a sheet thickness of 0.5 to 2 mm, desirably 0.5 to 1.5 mm, and a diameter, or length, of not greater than 15 centimeters are representative.

A hole is fashioned in the disklike glass material thus obtained, the outer perimeter of the glass blank is processed, and the main interior surface is processed by grinding and polishing to obtain a disk.

The background phenomenon of the present invention is as follows.

Focusing on the center portion of a piece of glass melt, cooling of the center portion occurs by the escape of heat by (1) the release of thermal radiation, (2) thermal conduction, and (3) convection (which can be mostly ignored). Of these, focusing on (1), since the absorption wavelength region of infrared radiation-absorbing ions overlaps the wavelength region of heat radiation, a portion of the thermal radiation released by the center portion ends up being absorbed by the infrared radiation-absorbing ions contained in the glass immediately outside the center portion. When that happens, absorption of the thermal radiation allows the outside glass to obtain heat, making it difficult for heat to escape to the outside of the glass as a whole, and the speed at which the viscosity of the glass rises following outflow decreases. The higher the concentration of these ions, the lower the speed at which the viscosity of the glass rises. Thus, even when the glass melt is molded under constant conditions, the glass thins and tends to extend, reducing the sheet thickness. In this manner, the present invention is an invention focusing not on what the sources of heat are on the exterior of the glass, such as heat treatment, but on the phenomenon by which the glass absorbs heat radiation that it itself has released.

Another aspect of the present invention is a method for manufacturing a disklike glass material comprising the successive molding of multiple pieces of disklike glass material from glass melt, characterized by:

in the course of molding multiple pieces of disklike glass material comprised of glass containing 0.1 to 100 ppm of infrared radiation-absorbing ions, variation over time in the concentration of the infrared radiation-absorbing ions contained in the glass melt being molded into said pieces of disklike glass material is suppressed to suppress variation in the sheet thickness of said multiple pieces of sheetlike glass material.

In this another aspect of the present invention, a method for manufacturing a disklike glass material comprising successively molding multiple pieces of disklike glass material, the above-described press molding as well as the floating method with mechanical processing can be used as is.

In this method of the present invention, variation over time in the concentration of infrared radiation-absorbing ions contained in a glass melt being molded into a disklike glass material is suppressed so that variation in the sheet thickness of said multiple pieces of disklike glass material falls within a range of ±15 percent of a reference value per 1,000 pieces of glass material. The median between the maximum value and the minimum value of the sheet thickness of said 1,000 pieces of glass material is adopted as the reference value. The variation in the plate thickness of 1,000 pieces of glass material is calculated, and based on that value, variation in the concentration over time of the infrared radiation-absorbing ions contained in the glass melt is suppressed to achieve good suppression of variation in the sheet thickness of the disklike glass material.

Suppression of variation in the sheet thickness of the multiple pieces of disklike glass material means keeping the variation within a range of ±15 percent of the reference value for 1,000 pieces of glass material. The above variation in sheet thickness is desirably kept to within a range of ±12 percent, preferably within a range of ±10 percent, more preferably within a range of ±10 percent, still more preferably within a range of ±8 percent, and yet still more preferably, within a range of ±6 percent. Suppression of variation in the sheet thickness of the multiple pieces of disklike glass material to within a range of ±15 percent, desirably to within a range of ±12 percent, preferably to within a range of ±10 percent, more preferably to within a range of ±8 percent, and still more preferably, to within a range of ±6 percent, for 1,000 pieces of glass material is desirable from the perspective of production efficiency.

The 1,000 pieces of glass material can be sampled at a suitable interval from the glass material being continuously produced. The "suitable interval" can be suitably determined based on the scale of production of the glass material and the volume of a single lot of starting material. The volume of a single lot of starting material is one factor affecting variation over time in the concentration of infrared radiation-absorbing ions contained in the glass melt. For example, one piece of glass material can be sampled for every 10 to 100,000 pieces, desirably for every 100 to 10,000 pieces.

The infrared radiation-absorbing ions can be ions of one or more metal selected from the group consisting of Fe, Cu, and Cr, for example. When the glass material contains infrared radiation-absorbing ions in the form of multiple types of ions, variation in the concentration of the type of ion present in the greatest quantity can be adjusted. In addition, when the glass material contains infrared radiation-absorbing ions in the form of multiple types of ions, variation in the concentration of the two or three types of ion present in the greater quantity can be adjusted. The content of infrared radiation-absorbing ions in the glass material is 0.1 to 100 ppm. The "content of infrared radiation-absorbing ions" means the content of each individual infrared radiation-absorbing ion.

However, when multiple types of infrared radiation-absorbing metal ions are contained, which infrared radiation-absorbing metal ions to regulate can be determined in the following manner. When multiple types of infrared radiation-absorbing metal ions are contained, let ion A denote the type of ion that is contained in the greatest quantity. Let Ma (%) denote the quantity of ion A. Any infrared radiation-absorbing metal ion B the content of which is less than $0.1 \times Ma$ (%) need not be regulated. This is because the amount of variation in ion B is small relative to the absolute quantity of ion A, and variation in the quantity of ion B can be ignored.

Suppression of variation over time in the concentration of the infrared radiation-absorbing ions contained in glass melt will be described below.

Glass melt is prepared by heating glass starting materials to melt them. The variation over time in the concentration of infrared radiation-absorbing ions contained in glass melt can be suppressed by adjusting the concentration of the infrared radiation-absorbing ions contained in the glass starting materials. Here, the infrared radiation-absorbing ions are ions that are unavoidably incorporated into the glass starting materials as impurities, and not ions that are added as additives for some purpose. The concentration of infrared radiation-absorbing ions incorporated as impurities is always intentionally adjusted. Thus, the quantity of infrared radiation-absorbing ions contained in the glass material is limited to 0.1 to 100 ppm, as set forth above. When the content of infrared radiation-absorbing ions is less than 0.1 ppm, the effect of the present invention achieved by suppressing variation over time in the concentration of infrared radiation-absorbing ions is achieved almost not at all, and when the content of infrared radiation-absorbing ions exceeds 100 ppm, there is normally almost no practical benefit based on the purity of the glass starting materials currently supplied by the market.

The concentration of the infrared radiation-absorbing ions contained in the glass starting materials can be adjusted by using starting materials having concentrations of infrared radiation-absorbing ions falling within prescribed ranges. Starting materials having concentrations of infrared radiation-absorbing ions falling within prescribed ranges can be obtained by specifying the infrared radiation-absorbing ion levels in various starting materials in orders to starting material manufacturers. This is the easiest way to keep the quantity of infrared radiation-absorbing ions contained in the material constant. Hereinafter, the "ion content" refers to the content when converted to an oxide. For example, silica starting material is obtained from a starting material manufacturer by specifying contents of impurities in the silica starting material in the form of an Fe ion content (converted to $Fe_2O_3$) of 10 to 20 ppm and a content of other infrared radiation-absorbing ions of less than 1 ppm. By allowing a looser limit of just the Fe ion content of the infrared radiation-absorbing ions contained as impurities in this manner, it is possible to regulate just the Fe ions.

For starting materials other than silica starting materials, such as alumina starting materials and soda starting materials, the starting materials are obtained based on the same specifications. By using starting materials conforming to such specifications, the regulation of ions other than Fe ions is avoided and the amount of variation in the Fe ion content can be kept to within ±50 percent. At a diameter ranging from 66.0 to 66.4 mm, it is possible to mass produce material with a sheet thickness ranging from 1.15 to 1.22 mm. The value obtained by dividing this range of variation in sheet thickness by the median (reference value) of the variation in sheet thickness can be kept within 6 percent.

When a looser quantity of Cr ions is specified in addition to that of Fe ions, it is possible to further reduce the cost of starting materials. For example, using the same Fe ion content as above and employing starting materials in which the Cr ion content ranges from 5 to 8 ppm makes it possible to keep the amount of variation in the ion content of both Fe and Cr to within ±50 percent, and permits the mass production of material having a diameter ranging from 66.0 to 66.4 mm and a sheet thickness ranging from 1.15 to 1.22 mm. The value obtained by dividing this range of variation in sheet thickness by the median (reference value) of the variation in sheet thickness can be kept to within 6 percent.

The concentration of infrared radiation-absorbing ions contained in glass starting materials can also be adjusted by measuring the content of infrared radiation-absorbing metal ions contained in the glass starting materials for each lot, and based on the measurement results for each lot, preparing mixed lots by mixing various lots to keep the concentration of infrared radiation-absorbing ions within a prescribed range. The content of infrared radiation-absorbing metal ions contained in the glass starting materials varies from lot to lot even for starting materials of prescribed specifications. In such cases, the content of infrared radiation-absorbing metal ions is measured for each lot, and based on the measurement results, mixed lots are prepared by mixing the various lots so that the concentration of infrared radiation-absorbing ions falls within the prescribed range. The results of measuring the content of infrared radiation-absorbing metal ions of each lot may be the results of analysis of each lot by the manufacturer of the starting material.

A method of manufacturing mixed lots by measuring in advance the content of infrared radiation-absorbing metal ions contained in glass starting materials will be described in detail below.

The content of infrared radiation-absorbing ions contained in starting materials is quantitatively analyzed for each lot. When the Fe ion content is 10 ppm or greater and the content of various infrared radiation-absorbing ions other than Fe and Cr is less than 1 ppm in each lot, assuming that some lots have Cr ion contents of less than 1 ppm and other lots have Cr ion contents of 1 ppm or greater, the quantities of Fe and Cr in the starting materials can then be regulated.

The reason for the variation in the contents of Fe and Cr ions incorporated into the glass is variation in the contents of Fe and Cr ions contained as impurities in each lot of starting material. Thus, the blending of a large number of lots reduces the range of variation in the contents of these ions. For example, when four lots of silica starting material were procured and the ion contents were measured, lot 1 had an Fe ion content of 10 ppm and a Cr ion content of 2 ppm, lot 2 had an Fe ion content of 20 ppm and a Cr ion content of 7 ppm, lot 3 had an Fe ion content of 12 ppm and a Cr ion content of 6 ppm, and lot 4 had an Fe ion content of 18 ppm and a Cr ion content of 5 ppm. Assuming the weight of each lot to be identical, the blending in of other starting materials such as an alumina starting material into each lot, when looking just at the silica starting material, caused the variation in Fe ion content to become 10 to 20 ppm and the variation in the Cr ion content to become 2 to 7 ppm. When lot 1 and lot 2 were mixed to obtain mixed lot 1 and lot 3 and lot 4 were mixed to obtain mixed lot 2, the range of variation in the Fe ion content became 0 ppm and the variation in the Cr ion content became 4.5 to 5.5 ppm. By mixing lots, it was possible to reduce the range of variation. By mixing two or more lots in this fashion, it was possible to achieve a variation range in ion content approaching zero. From this perspective, the mixing of three or more lots is desirable. The above example relates to silica starting materials, but the same logic holds true for other starting materials, such as alumina starting materials, soda starting materials, and zirconia starting materials. By subjecting the various starting materials to the above-described operation, it is possible to reduce the range of variation in the content of infrared radiation-absorbing metal ions incorporated into the material and to reduce the range of variation in the sheet thickness of the material.

The concentration of infrared radiation-absorbing ions contained in starting materials can also be adjusted by measuring over time the sheet thickness and/or diameter of part or all of the multiple pieces of disklike glass material, and based on these measurement results, selecting glass starting materials for preparation of the glass melt so that the concentration of infrared radiation-absorbing ions of the glass melt falls within the prescribed range. Here, the glass starting material for preparing the glass melt can either be starting materials having concentrations of infrared radiation-absorbing ions falling within prescribed ranges, or mixed lots prepared by measuring the content of infrared radiation-absorbing metal ions contained in each lot of glass starting material, and based on the measurement results, mixing the lots so that the concentration of infrared radiation-absorbing ions falls within the prescribed range.

In methods of selecting glass starting materials based on the results of monitoring the sheet thickness or diameter of the material, data are collected on how the sheet thickness of the material changes based on the content of infrared radiation-absorbing metal ions or on how the sheet thickness changes by molding glasses having different ion concentrations in advance.

Blended starting materials are charged to a melting crucible, heated, and melted to obtain a glass melt. This glass melt is then fed into a clarifying crucible and clarified. Following clarification, the glass melt is fed into an operating crucible, where it is stirred and homogenized, and then caused to flow out. The outflowing glass melt is molded into a material. The sheet thickness of the material immediately after molding is measured. When the sheet thickness exhibits a tendency to decrease, the content of infrared radiation-absorbing ions in the starting material is determined to be high, and the starting material being fed into the melting crucible is replaced with a starting material of lower ion content. As will be understood from this process, time is required for the starting material that is being fed to become glass melt and flow out. However, by selecting the starting material that is fed into the melting crucible based on the results of monitoring the sheet thickness, the tendency toward reduction in the sheet thickness can be stopped before the sheet thickness drops out of the reference range, and feedback that keeps the median of the sheet thickness within the reference range is possible. In the above-described operation, it is also possible to reference data obtained in advance on the content of infrared radiation-absorbing ions contained in the starting materials and in materials, and on changes in sheet thickness.

In press molding, glass melt gobs corresponding to single pieces of material are cut and separated from an outflowing glass melt flow. After setting a constant outflow speed for the glass melt and a constant cutting cycle for the glass melt flow to successively obtain glass melt gobs of constant weight, the diameter of the disklike material can be monitored instead of the sheet thickness to provide feedback for the selection of the glass starting material.

When measuring the sheet thickness or diameter of the material immediately after molding, it is desirable to employ a non-contact measuring device such as an optical distance sensor to avoid damaging the material.

The glass material can be glass containing 40 to 85 weight percent of $SiO_2$ as a glass component.

Examples of the material of the glass material are: aluminosilicate glass, soda lime glass, soda aluminosilicate glass, aluminoborosilicate glass, borosilicate glass, quartz glass, chain silicate glass, crystallized glass, and other glass ceramics. Glasses of the following compositions are desirably employed.

(1) Crystallized glass 1 containing, denoted as weight percentages: 60 to 87 percent of $SiO_2$; 5 to 20 percent of $Li_2O$; 0 to 5 percent of $Na_2O$; 0 to 10 percent of $K_2O$; a total of 0.5 to 10 percent of $Na_2O$ and $K_2O$; 0.5 to 7.5 percent of MgO; 0 to 9.5 percent of CaO; 0 to 15 percent of SrO; 0 to 13 percent of BaO; 0 to 13 percent of ZnO; 0 to 10 percent of $B_2O_3$; 0 to 10 percent of $Al_2O_3$; 0.5 to 8 percent of $P_2O_5$; 0 to 5 percent of $TiO_2$; 0 to 3 percent of $ZrO_2$; 0 to 3 percent of $SnO_2$; a total of 0 to 2 percent of $As_2O_3$ and $Sb_2O_3$; a 0 to 5 percent total quantity of F in a metal element fluorine compound of one or more of the above metal oxides; in some cases, 0 to 5 percent of a coloring component in the form of at least one member selected from the group consisting of $V_2O_5$, CuO, $MnO_2$, $Cr_2O_3$, CoO, $MoO_3$, NiO, $Fe_2O_3$, $TeO_2$, $CeO_2$, $Pr_2O_3$, $Nd_2O_3$, and $Er_2O_3$; and main crystal in the form of lithium disilicate, and in some cases, alpha-crystobalite, alpha-quartz, lithium monosilicate, beta-spodumene, or the like with a crystal grain size of not greater than 3.0 micrometers.

(2) Crystallized glass 2 containing, denoted as weight percentages: 45 to 75 percent of $SiO_2$; 4 to 30 percent of CaO; 2 to 15 percent of $Na_2O$; 0 to 20 percent of $K_2O$; 0 to 7 percent of $Al_2O_3$; 0 to 2 percent of MgO; 0 to 2 percent of ZnO; 0 to 2 percent of $SnO_2$; 0 to 1 percent of $Sb_2O_3$; 0 to 6 percent of $B_2O_3$; 0 to 12 percent of $ZrO_2$; 0 to 3 percent of $Li_2O$; a 3 to 12 percent total quantity of F in a metal element fluorine compound of one or more of the above metal oxides; in some cases, a coloring component in the form of $Cr_2O_3$, $CO_3O_4$, or the like; and a main crystal in the form of canasite or potassium fluorolihiterite with a crystal grain size of not greater than 1.0 micrometer.

(3) Glass 3 containing, denoted as weight percentages: 62 to 75 percent of $SiO_2$; 4 to 18 percent of $Al_2O_3$; 0 to 15 percent of $ZrO_2$; 3 to 12 percent of $Li_2O$; and 3 to 13 percent of $Na_2O$. A chemically strengthened glass containing, as weight percentages: 62 to 75 percent of $SiO_2$; 5 to 15 percent of $Al_2O_3$; 4 to 10 percent of $Li_2O$; 4 to 12 percent of $Na_2O$; and 5.5 to 15 percent of $ZrO_2$; the weight ratio of $Na_2O/ZrO_2$ being 0.5 to 2.0; and the weight ratio of $Al_2O_3/ZrO_2$ being 0.4 to 2.5.

Crystallization of the Material

The glass material obtained can be heat treated to obtain a glass material comprised of crystallized glass. The glass material can be crystallized either before or after fashioning a hole to obtain a disk.

In the course of heat treating the material to obtain crystallized glass, the material is first heated to a temperature lower than the crystallization temperature, at which it is maintained to induce phase separation. The temperature is then raised to cause the crystal phase to precipitate. When an infrared radiation heater is employed for heating, the heating efficiency will vary with the content of infrared radiation-absorbing metal ions contained in the material. When there is variation in the content of these ions between materials, there will be variation in the heating efficiency of the materials. When that happens, variation results in the number and size of the crystal phase precipitated by crystallization treatment under constant conditions. Since various physical properties, such as the mechanical properties of the crystallized glass, vary with the size and density of the crystal phase, resulting in variation in the properties of the substrates that are produced, such situations must be avoided.

The present invention permits a reduction in variation in the content of infrared radiation-absorbing metal ions between materials, thereby permitting the attaining of constant heating efficiency between materials during crystallization processing. As a result, it is possible to obtain a crystallized glass substrate having constant properties.

The above-described disklike glass material can be an information recording medium substrate-use material. In the manufacturing of an information recording medium substrate from an information recording medium substrate-use material, as set forth above, various steps are implemented such as forming a hole in the center of the above-described disklike glass material obtained, processing the outer perimeter thereof, and grinding and polishing the main surfaces thereof to obtain a disk suited to use as an information recording medium substrate.

The surfaces of such a glass substrate (disk) can be subjected to chemical strengthening processing by a low-temperature ion-exchange method to enhance shock resistance, vibration resistance, and the like. Here, the chemical strengthening method is not specifically limited other than that it be a known chemical strengthening method. A preferred example is low-temperature chemical strengthening in which ion exchange is conducted within a range that does not exceed the glass transition temperature. Examples of alkali molten salts employed in chemical strengthening are potassium nitrate, sodium nitrate, and nitrates in the form of mixtures thereof.

Further, information recording media can be manufactured using the above-described information recording medium substrate. When the information recording medium is a magnetic recording medium, a magnetic recording medium can be constituted by sequentially depositing an underlayer, a magnetic layer, a protective layer, and a lubricating layer on the above-described information recording medium-use glass substrate.

Examples of the underlayer are underlayers comprised of one or more materials selected from the group consisting of nonmagnetic metals such as Cr, Mo, Ta, Ti, W, V, B, and Al. When Co is employed as the main component of a magnetic layer, simple Cr or a Cr alloy is desirably employed from the perspective of enhancing magnetic characteristics. The underlayer is not limited to a single layer, and may have a multilayered structure comprised of identical or heterogeneous stacked layers. Examples of multilayered underlayers are: Cr/Cr, Cr/CrMo, Cr/CrV, CrV/CrV, Al/Cr/CrMo, Al/Cr/Cr, Al/Cr/CrV, and Al/CrV/CrV.

Examples of the magnetic layer are magnetic thin films comprised primarily of Co, such as: CoPt, CoCr, CoNi, CoNiCr, CoCrTa, CoPtCr, CoNiPt, CoNiCrPt, CoNiCrTa, CoCrTaPt, and CoCrPtSiO. In the magnetic layer, the magnetic film may be divided by a nonmagnetic film (such as Cr, CrMo, CrV) in a multilayered structure designed to reduce noise (such as: CoPtCr/CrMo/CoPtCr and CoCrTaPt/CrMo/CoCrTaPt). Magnetic layers for use with magnetoresistive heads (MR heads) and giant magnetoresistive heads (GMR heads) are also covered, such as a magnetic layer into which one or more impurity elements selected from among Y, Si, rare earth elements, Hf, Ge, Sn, and Zn, or oxides of these impurity elements, are incorporated into a Co-based alloy. In addition to the above, the magnetic layer may be ferrite-based, iron-rare earth element-based, or have a granular structure that is comprised of Fe, Co, FeCo, CoNiPt, or some other magnetic particle dispersed in a nonmagnetic film comprised of $SiO_2$ or BN. The magnetic layer may employ any recording format, such as an in-plane or vertical recording format.

Examples of the protective layer are: Cr films, Cr alloy films, carbon films, zirconia films, and silica films. These protective layers may be formed with an in-line sputtering device so that they are continuous with the underlayer, magnetic film, or the like. These protective layers may be in the form of a single layer, or may have a multilayered structure comprised of identical or heterogeneous films. Another protective layer may be formed over, or instead of, the above-described protective layer. For example, instead of the above protective layer, colloidal silica microparticles may be dispersed in tetraalkoxysilane diluted with an alcohol-based solvent, the dispersion applied over a Cr film, and the application baked to form a silicon oxide ($SiO_2$) film.

The lubricating layer may be formed, for example, by diluting a liquid lubricant in the form of perfluoropolyether (PFPE) with a solvent such as freon; applying it to the medium surface by dipping, spincoating, or spraying; and, as necessary, conducting a heat treatment.

Embodiments

The present invention is described in greater detail below through embodiments.

(Embodiment 1)

In the procuring of various starting materials corresponding to oxides, carbonates, nitrates, and the like of components incorporated into glass, such as a silica starting material, alumina starting material, boric acid starting material, and other materials, orders for starting materials were issued to a starting material manufacturer specifying an Fe ion content (as converted to $Fe_2O_3$) of 10 to 20 ppm and a content of other infrared radiation-absorbing ions of less than 1 ppm in each of the starting materials. For confirmation, the contents of various metal ions such as Fe, Cu, Cr, Mn, Nd, Pr, V, Ni, Mo, Ho, and Er contained as impurities in the various starting materials were measured by the alkali fusion method. The results revealed that in all of the lots of the silica starting material, as converted to oxide, the content of Fe was 14 to 18 ppm and the content of other metal ions as converted to oxides was less than 1 ppm. In all of the lots of alumina starting material as converted to oxide, the content of Fe was 10 to 16 ppm and the content of other metal ions as converted to oxides was less than 1 ppm. For all other starting materials, the content of all metal ions as converted to oxides was less than 1 ppm.

Accordingly, only the Fe content was regulated among the infrared radiation-absorbing metal ions.

The various starting materials were weighed out to yield glasses of the various compositions of nos. 1 to 10 in Table 1 and the starting materials that had been weighed out were thoroughly mixed to prepare multiple blended starting materials for melting into glasses of the same composition. The blended starting materials were then placed in a melting crucible, heated, and melted. The glass melts obtained were fed into clarifying crucibles for clarification and removal of gas bubbles, fed to operating crucibles where they were thoroughly stirred and homogenized, made to flow out through pipes, and press molded to successively form disklike glass materials. The glass materials were then annealed to experimentally mass produce glass materials. The glass melt in the melting crucible decreased as the glass flowed out, but glass melting, clarification, and homogenization were conducted while introducing a blended starting material into the melting crucible to compensate for the amount of the decrease.

Various conditions including the pressure employed in press molding, the timing of pressing, the temperature of the upper mold, lower mold, and sleeve, the weight of the glass melt gobs being pressed, and the outflow temperature of the glass melt, were set so to yield a disklike glass material with a diameter of 66.0 mm and a sheet thickness of 1.15 mm. These same conditions were employed in the molding of the various materials. A total of 30 pieces of glass material were sampled from among the materials experimentally mass produced, one from the material initially molded from the glass material, one from the finally molded material, and 28 from the material molded between the initial and final material at 28 evenly divided time intervals. When the content of infrared radiation-absorbing metal ions contained in the various materials was measured, the Fe content fell within a range between the maximum value Mmax and the minimum value Mmin, as shown in Table 1 below. The range of variation was equal to the value given in Table 1. The range of variation in the content of Fe was calculated by the formula: ±2 (Mmax−Mmin)/(Mmax+Mmin).

The range of variation in the sheet thickness was calculated as: 2×(maximum value−minimum value)/(maximum value+minimum value), wherein the values being in sheet thickness. Similarly, the range in the variation of the diameter was calculated as 2×(maximum value−minimum value)/(maximum value+minimum value), wherein the values being in diameter. The range in variation of the sheet thickness and the range in variation of the diameter were determined by sampling 1,000 pieces of the disklike glass material that were produced. Sampling was conducted at times obtained by dividing the time between the start and end of mass production into 998 equal intervals, and adding the disklike glass materials molded at the start and end of mass production, totaling 1,000 pieces. The diameter and sheet thickness of each sample was measured.

TABLE 1

| (mass %) | No. 1 | No. 2 | No. 3 | No. 4 | No. 5 |
|---|---|---|---|---|---|
| $SiO_2$ | 64.0 | 61.0 | 65.0 | 68.0 | 59.0 |
| $Al_2O_3$ | 15.0 | 16.0 | 17.5 | 11.0 | 8.0 |
| $B_2O_3$ | 0.0 | 0.0 | 0.0 | 0.0 | 0.0 |
| $ZrO_2$ | 2.0 | 0.0 | 0.0 | 0.0 | 0.0 |
| $Li_2O$ | 4.0 | 4.0 | 4.5 | 2.0 | 0.0 |
| $Na_2O$ | 11.0 | 11.0 | 9.0 | 11.0 | 4.0 |
| $K_2O$ | 0.5 | 1.0 | 0.5 | 1.0 | 7.0 |
| MgO | 1.0 | 2.0 | 1.5 | 4.0 | 2.0 |
| CaO | 2.5 | 5.0 | 2.0 | 3.0 | 5.0 |
| SrO | 0.0 | 0.0 | 0.0 | 0.0 | 7.0 |
| BaO | 0.0 | 0.0 | 0.0 | 0.0 | 8 |

TABLE 1-continued

| (wt %) | | | | | |
|---|---|---|---|---|---|
| $TiO_2$ | 0.0 | 0.0 | 0.0 | 0.0 | 0.0 |
| $La_2O_3$ | 0.0 | 0.0 | 0.0 | 0.0 | 0.0 |
| Total | 100.0 | 100.0 | 100.0 | 100.0 | 100.0 |
| Fe  Mmax (ppm) | 18 | 22 | 24 | 23 | 19 |
| Mmin (ppm) | 16 | 19 | 18 | 18 | 16 |
| Variation range | ±12% | ±15% | ±29% | ±24% | ±17% |
| Cr  Mmax (ppm) | 0.7 | 0.6 | 0.7 | 0.8 | 0.6 |
| Mmin (ppm) | 0.5 | 0.5 | 0.6 | 0.6 | 0.5 |
| Variation range | ±33% | ±18% | ±15% | ±29% | ±18% |
| Sheet thickness reference value (mm) | 1.18 | 1.17 | 1.17 | 1.18 | 1.17 |
| Sheet thickness variation range (%) | 5.1 | 2.6 | 3.4 | 4.3 | 2.5 |
| Diameter (mm) | 66.2 | 66.1 | 66.2 | 66.2 | 66.1 |
| Diameter variation range (%) | 0.6 | 0.3 | 0.43 | 0.45 | 0.3 |

| | No. | | | |
|---|---|---|---|---|
| (wt %) | 6 | 7 | 8 | 9 |
| $SiO_2$ | 58.0 | 58.0 | 67.0 | 68.0 |
| $Al_2O_3$ | 7.0 | 7.0 | 13.0 | 12.0 |
| $B_2O_3$ | 0.0 | 0.0 | 2.0 | 2.0 |
| $ZrO_2$ | 0.0 | 0.0 | 2.0 | 2.0 |
| $Li_2O$ | 0.0 | 0.0 | 6.0 | 6.0 |
| $Na_2O$ | 4.0 | 5.0 | 4.0 | 4.0 |
| $K_2O$ | 7.0 | 8.0 | 2.0 | 2.0 |
| MgO | 2.0 | 2.0 | 0.0 | 0.0 |
| CaO | 6.0 | 5.0 | 0.0 | 0.0 |
| SrO | 7.0 | 7.0 | 0.0 | 0.0 |
| BaO | 9.0 | 8.0 | 0.0 | 0.0 |
| $TiO_2$ | 0.0 | 0.0 | 2.0 | 2.0 |
| $La_2O_3$ | 0.0 | 0.0 | 2.0 | 2.0 |
| Total | 100.0 | 100.0 | 100.0 | 100.0 |
| Fe  Mmax (ppm) | 19 | 17 | 23 | 25 |
| Mmin (ppm) | 15 | 15 | 20 | 19 |
| Variation range | ±24% | ±13% | ±14% | ±27% |
| Cr  Mmax (ppm) | 0.7 | 0.7 | 0.7 | 0.8 |
| Mmin (ppm) | 0.5 | 0.6 | 0.5 | 0.6 |
| Variation range | ±33% | ±15% | ±33% | ±29% |
| Sheet thickness reference value (mm) | 1.19 | 1.17 | 1.18 | 1.18 |
| Sheet thickness variation range (%) | 5.9 | 2.6 | 5.0 | 4.2 |
| Diameter (mm) | 66.2 | 66.1 | 66.2 | 66.2 |
| Diameter variation range (%) | 0.6 | 0.3 | 0.5 | 0.5 |

From the results shown in Table 1, it will be understood that all of glass nos. 1 to 10 exhibited glass material sheet thicknesses falling within the range of 1.15 to 1.22 mm and sheet thickness variation ranges of less than 6 percent. The diameters of the various glass materials all fell within a range of 66.0 to 66.4 mm, with a diameter variation range of less than 0.6 percent.

(Embodiment 2)

Next, in the procuring of various starting materials corresponding to oxides, carbonates, nitrates, and the like of components incorporated into glass, such as a silica starting material, alumina starting material, boric acid starting material, and other materials, orders for starting materials were issued to starting material manufacturers specifying an Fe ion content (as converted to $Fe_2O_3$) of 10 to 20 ppm, a Cr ion content (as converted to $Cr_2O_3$) of 5 to 8 ppm, and a content of other infrared radiation-absorbing ions of less than 1 ppm in each of the starting materials. For confirmation, the contents of various metal ions such as Fe, Cu, Cr, Mn, Nd, Pr, V, Ni, Mo, Ho, and Er contained as impurities in the various starting materials were measured by the alkali fusion method. The results revealed that in all of the lots of the silica starting material, as converted to oxide, the content of Fe was 15 to 19 ppm, the Cr content was 5 to 7 ppm, and the content of other metal ions as converted to oxides was less than 1 ppm. In all of the lots of alumina starting material as converted to oxide, the content of Fe was 12 to 17 ppm and the content of other metal ions as converted to oxides was less than 1 ppm. For all of the other starting materials, the content of all metal ions as converted to oxides was less than 0.1 ppm.

Glass melting, clarification, and homogenization were conducted in the same manner as in Embodiment 1 and press molding was conducted in the same manner as in Embodiment 1 to manufacture materials.

The diameter and sheet thickness of the disklike glass materials sampled above were measured. For all of the glasses, the sheet thickness of the various materials ranged from 1.15 to 1.22 mm and the sheet thickness variation range was kept to within 6 percent. The diameter ranged from 66.0 to 66.4 mm, and the diameter variation range of the materials was kept to within 0.6 percent.

(Embodiment 3)

Starting materials corresponding to oxides and carbonates of components incorporated into glass, such as a silica starting material, alumina starting material, boric acid starting material, and other materials, were procured. The content of various metal ions such as Fe, Cu, Cr, Mn, Nd, Pr, V, Ni, Mo, Ho, and Er contained as impurities in the various starting materials were measured by the alkali fusion method. Since the metal ion contents sometimes varied by starting material lot, the above measurements were conducted for each lot.

The table below gives the results of the measurement of the contents of various infrared radiation-absorbing metal ions by starting material lot.

TABLE 2

| Starting material Silica | Fe ion content (ppm) | Cr ion content (ppm) | Content of other ions (ppm) |
|---|---|---|---|
| Lot 1 | 18 | 0.4 | Less than 1 |
| Lot 2 | 15 | 0.5 | Less than 1 |
| Lot 3 | 23 | 2.2 | Less than 1 |
| Lot 4 | 25 | 4.3 | Less than 1 |
| Lot 5 | 12 | 0.7 | Less than 1 |
| Lot 6 | 14 | 1.1 | Less than 1 |
| Lot 7 | 19 | 0.6 | Less than 1 |
| Lot 8 | 12 | 3.3 | Less than 1 |
| Lot 9 | 24 | 2.1 | Less than 1 |
| Lot 10 | 13 | 1.6 | Less than 1 |
| Variation range 1 | 12 to 25 | 0.4 to 4.3 | — |
| Variation range 2 | 13 to 19 | 1 to 2 | — |

Note:
Variation range 1 is the variation range when each lot was employed independently. Variation range 2 is the variation range when lots 1 to 3, lots 4 to 6, and lots 7 to 9 were mixed respectively to obtain three mixed lots, and along with lot 10, employed as a total of four lots.

TABLE 3

| Starting material Alumina | Fe ion content (ppm) | Cr ion content (ppm) | Cu ion content (ppm) |
|---|---|---|---|
| Lot 1 | 10 | 2.1 | Less than 1 |
| Lot 2 | 9 | 1.8 | Less than 1 |
| Lot 3 | 7 | 1.3 | Less than 1 |
| Lot 4 | 11 | 1.4 | Less than 1 |
| Lot 5 | 6 | 1.1 | Less than 1 |
| Variation range 1 | 6 to 11 | 1.1 to 2.1 | — |
| Variation range 2 | 8.5 to 8.7 | 1.3 to 1.7 | — |

Note:
Variation range 1 is the variation range when each lot was employed independently. Variation range 2 is the variation range when lots 1 to 3, lots 4 and 5 were mixed and employed as two mixed lots.

TABLE 4

| Starting material | Fe ion content (ppm) | Cr ion content (ppm) | Cu ion content (ppm) |
|---|---|---|---|
| $ZrO_2$ | | | |
| Lot 1 | 22 | Less than 1 | Less than 1 |
| Lot 2 | 19 | Less than 1 | Less than 1 |
| Lot 3 | 27 | Less than 1 | Less than 1 |
| Lot 4 | 16 | Less than 1 | Less than 1 |
| Variation range 1 | 16 to 27 | — | — |
| Variation range 2 | 20.5 to 21.5 | — | — |
| $TiO_2$ | | | |
| Lot 1 | 23 | Less than 1 | Less than 1 |
| Lot 2 | 15 | Less than 1 | Less than 1 |
| Lot 3 | 17 | Less than 1 | Less than 1 |
| Lot 4 | 27 | Less than 1 | Less than 1 |
| Variation range 1 | 15 to 27 | — | — |
| Variation range 2 | 19 to 22 | — | — |

Note:
Variation range 1 is the variation range when each lot was employed independently. Variation range 2 is the variation range when lots 1 and 2 and lots 3 and 4 were mixed and employed as two mixed lots.

TABLE 5

| Starting material | Fe ion content (ppm) | Cr ion content (ppm) | Cu ion content (ppm) |
|---|---|---|---|
| Boric acid | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Lithium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Sodium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Lot 4 | Less than 1 | Less than 1 | Less than 1 |
| Potassium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Magnesium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Calcium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Strontium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| Barium carbonate | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |
| $La_2O_3$ | | | |
| Lot 1 | Less than 1 | Less than 1 | Less than 1 |
| Lot 2 | Less than 1 | Less than 1 | Less than 1 |
| Lot 3 | Less than 1 | Less than 1 | Less than 1 |

The results given in Tables 2 to 5 indicate that based on the following principle, when the Fe ion content and the Cr ion content were regulated in the silica and alumina starting materials and the Fe ion content was regulated in the $ZrO_2$ and $TiO_2$ starting materials, without regulation in the other starting materials, the effect on sheet thickness fluctuation was negligible.

Principle: When multiple types of infrared radiation-absorbing metal ions are contained, let A denote the ion that is contained in the greatest quantity. Let Ma (%) denote the quantity of ion A. Any infrared radiation-absorbing metal ion B the content of which is less than 0.1×Ma (%) need not be regulated. This is because the amount of variation in ion B is small relative to the absolute quantity of ion A, and variation in the quantity of ion B can be ignored.

Next, lots 1 to 3, 4 to 6, and 7 to 9 of the silica starting material were thoroughly mixed to obtain three mixed lots. These, in combination with lot 10, amounted to a total of four lots, which were employed in blending. When each of the 10 lots was separately employed in blending, the variation range of the Fe ion content in the silica starting material was 12 to 25 ppm (±30 percent relative to the median). By contrast, the above described operation yielded a variation range of 13 to 19 ppm (±19 percent relative to the median). For the Cr ion content, 0.4 to 4.3 ppm (±83 percent relative to the median) was achieved when the lots were employed separately, and a variation range of 1 to 2 ppm (±33 percent relative to the median) was achieved by the above operation.

For the other starting materials, as well, the preparation of suitable mixed lots as indicated in the table above made it possible to reduce the variation range of the Fe and Cr ion contents.

As a result, in the same manner as Embodiments 1 and 2, it was possible to mass produce materials exhibiting little variation in sheet thickness and diameter.

In the above embodiment, lots were selected to prepare mixed lots irrespective of the contents of Fe ions and Cr ions contained in the lots. However, when lots having high Fe ion and Cr ion contents are thoroughly mixed with lots having low contents, it is possible to prepare starting materials with low variation ranges for the contents of both ions.

(Embodiment 4)

The diameter of the material to be prepared was set to 66.0 mm and the sheet thickness to 1.15 mm.

In the same manner as in Embodiments 1 to 3, the glasses were melted, a glass melt flow was caused to flow out at constant speed, and a knife was used at a constant cycle to cut and successively separate glass melt gobs. Next, the separated glass melt gobs were received on the lower mold of a circulating pressing mold, pressed between an upper mold that was opposed to the lower mold, and the lower mold itself, and extended into a disklike shape within a cavity defined by the upper and lower molds and a sleeve member guiding the upper and lower molds. After molding the glass into a disklike shape in this manner, the upper mold was withdrawn upward. In that state, the disklike material remained on the lower mold. A digital optical distance sensor was employed to measure the diameter and sheet thickness of the material. When monitoring the sheet thickness, for example, since the material was on the molding surface of the lower mold, the distance from the distance sensor to the molding surface of the lower mold and the distance from the same sensor to the upper surface of the material was measured, and based on the distance information outputted by the sensor, the difference between the two distances was calculated to determine the sheet thickness. The sensor could be secured so that as the molded pieces of glass material successively passed beneath it, it measured in real time the sheet thickness of the pieces of glass material immediately after molding. The information on the sheet thickness thus obtained was compared to a reference sheet thickness. When the sheet thickness shifted in the direction of greater thickness than the reference sheet thickness, a starting material having a high content of infrared radiation-absorbing metal ions was introduced into the melting crucible. Conversely, when the sheet thickness shifted in the direction of less thickness than the reference sheet thickness, a starting material having a low content of infrared radiation-absorbing metal ions was introduced into the melting crucible.

For example, a blended starting material 1 having an Fe ion content of 25 ppm, a blended starting material 2 having an Fe ion content of 18 ppm, and a blended starting material 3 having an Fe ion content of 14 ppm could be prepared. The content of all other single infrared radiation-absorbing metal ions would be less than 1 ppm in all three of the mixed starting materials.

Assume that the reference sheet thickness is 1.19 mm and that the monitored sheet thickness exhibits a diminishing trend of from 1.18 mm to 1.17 mm. In this case, compensation would be made by introducing blended starting material 1 into the melting crucible. Conversely, when the monitored sheet thickness exhibits an increasing trend of from 1.20 mm to 1.21 mm, compensation would be made by introducing blended starting material 3 into the melting crucible. When the monitored sheet thickness is close to the reference sheet thickness, no change would be made in the blended starting material that is being introduced into the melting crucible.

In this manner, the sheet thickness was kept to within a range of 1.15 to 1.22 mm and the diameter to within a range of 66.0 to 66.4 mm. It would also be possible to monitor the diameter in the same manner to provide feedback for the selection of blended starting materials.

In the above method, the sheet thickness variation trend is calculated over a period of minutes, and based on the trend, a starting material is selected. However, the time used to calculate the sheet thickness variation trend is desirably suitably adjusted based on the size of the glass melting equipment.

Holes were fashioned in the centers of the disklike glass materials obtained in Embodiments 1 to 4, the inner and outer perimeters thereof were processed, and the main surfaces thereof were ground and polished to experimentally mass produce magnetic disk-use glass substrates. The substrates comprised of glasses nos. 1 to 4, 8, and 9 could be optionally chemically strengthened by immersion in molten salt containing sodium nitrate and potassium nitrate. The substrates comprised of glasses nos. 5 to 7 could be optionally chemical strengthened by immersion in a molten salt in the form of potassium nitrate. Alternatively, just the outer perimeter surface of the glass substrates could be chemically strengthened, or not chemically strengthened.

The above examples relate to press molding methods. However, even when the glass melt is molded into a sheetlike glass material by the floating method, the starting materials can be regulated as set forth above to mass produce constant glass materials.

Commercial starting materials were employed in the above embodiments. However, it is also possible to purchase starting materials containing certain impurities and regulate the starting materials so that the level of metal ion impurities in the material becomes constant, and stably obtain a material of constant sheet thickness.

Each of the substrates obtained in this fashion was placed in a sputtering film-forming device for single-substrate processing and heated with a carbon heater. A multilayer film containing a magnetic recording layer was formed on each substrate. The infrared radiation generated by the carbon heater was absorbed to the same degree by each substrate, so each substrate was heated to the same temperature and it was possible to experimentally mass produce magnetic disks with multilayer films of stable quality.

To increase the efficiency of absorption of the infrared radiation generated by the above carbon heater, 0.03 weight percent of Fe ions as converted to $Fe_2O_3$ was added while keeping the ratio of the components of the various compositions shown in Table 1 constant. The Fe ions were added by uniformly admixing $Fe_2O_3$ in the stated quantity to the blended starting material employed in the above embodiment. The molding conditions were also optimized and glass material was molded to obtain glass material of the same shape and size as in the above embodiment. When the diameter and sheet thickness of disklike glass materials sampled in the same manner as in the above embodiment were measured, each of the glasses exhibited a material diameter falling within a range of from 66.0 to 66.4 mm and a sheet thickness falling within a range of 1.15 to 1.22 mm. Measurement of the $Fe_2O_3$ content of these glass materials revealed a maximum of 0.032 mass percent and a minimum of 0.029 mass percent, or a variation range of ±10 percent.

Next, in the same manner as above, to increase the efficiency of absorption of infrared radiation, 0.03 weight percent of Cr ions as converted to $Cr_2O_3$ was added while keeping the ratio of the components of the various compositions shown in Table 1 constant. The Cr ions were added by uniformly admixing $Cr_2O_3$ in the stated quantity to the blended starting material employed in the above embodiment. The molding conditions were also optimized and glass material was molded to obtain glass material of the same shape and size as in the above embodiment. When the diameter and sheet thickness of disklike glass materials sampled in the same manner as in the above embodiment were measured, each of the glasses exhibited a material diameter falling within a range of from 66.0 to 66.4 mm and a sheet thickness falling within a range of 1.15 to 1.22 mm. Measurement of the $Cr_2O_2$ content of these glass materials revealed a maximum of 0.014 mass percent and a minimum of 0.011 mass percent, or a variation range of ±25 percent.

COMPARATIVE EXAMPLE 1

A blended starting material was prepared from the starting material lots employed in Embodiment 2 without preparing mixed lots and a glass melt was prepared by introducing this blended starting material into a melting crucible. When the material was press molded, the sheet thickness of the disklike glass material was 1.08 to 1.29 mm and the diameter was 66.0 to 67.9 mm, indicating variation. The variation range of the sheet thickness was 18 percent and that of the diameter was 2.8 percent.

Preparing a substrate from this material required adding an extra step to the processing of the material prepared in Embodiment 1, increasing both time and cost.

INDUSTRIAL APPLICABILITY

The methods of the present invention are useful in the field of manufacturing information recording medium substrate-use materials, information recording medium substrates, and information recording media.

The invention claimed is:

1. A method for manufacturing multiple pieces of a disklike glass material, a sheet thickness of said pieces of disklike glass material varying within a range, comprising:
preparing a glass melt by heating a starting material to melt while maintaining an Fe ion content in the starting material at a constant level so that an amount of variation in the Fe ion content in the glass melt be kept to within ±50 percent;
the successive molding of multiple pieces of disklike glass material from the glass melt, wherein the Fe ion content in the disklike glass material ranges from 0.1 to 100 ppm and the molding of the glass melt into disklike glass materials comprises:
controlling variation over time in the concentration of infrared radiation-absorbing ions contained in the glass melt being molded into said pieces of disklike glass material so that the variation in the sheet thickness of said multiple pieces of disklike glass material falls within a range of ±15 percent of a reference value, said reference value being the median between the maximum value and the minimum value of the sheet thickness of 1,000 pieces of said glass material, and
press molding glass melt to obtain a disklike glass material.

2. The method for manufacturing according to claim 1, wherein the sheet thickness of said disklike glass material is from 0.5 to 1.5 mm.

3. The method for manufacturing according to claim 1, wherein said glass material is heat treated to obtain a glass material comprised of crystallized glass.

4. The method for manufacturing according to claim 1, wherein said disklike glass material is a material particularly suited for use in an information recording medium substrate.

5. A method for manufacturing multiple pieces of a disklike glass material, a sheet thickness of said pieces of disklike glass material varying within a range, comprising:
preparing a glass melt by heating a starting material to melt while maintaining at least one of an Fe ion content and a Cr ion content in the starting material at a constant level so that an amount of variation in at least one of the Fe ion content and the Cr ion content in the glass melt is kept to within ±50 percent;
the successive molding of multiple pieces of disklike glass material from the glass melt,
wherein in the course of molding multiple pieces of disklike glass material comprised of glass containing 0.1 to 100 ppm of at least one infrared radiation-absorbing ion of a metal selected from the group consisting of Fe, Cu and Cr, variation over time in the concentration of the infrared radiation-absorbing ions contained in the glass melt being molded into said pieces of disklike glass material is controlled to suppress variation in the sheet thickness of said multiple pieces of sheetlike glass material, and
wherein the molding of the glass melt into disklike glass materials comprises the step of press molding glass melt to obtain a disklike glass material.

6. The method for manufacturing according to claim 5, wherein the sheet thickness of said disklike glass material is from 0.5 to 1.5 mm.

7. The method for manufacturing according to claim 5, wherein said glass material is heat treated to obtain a glass material comprised of crystallized glass.

8. The method for manufacturing according to claim 5, wherein said disklike glass material is a material particularly suited for use in an information recording medium substrate.

9. A method for manufacturing information recording medium-use glass substrates, comprising:
preparing a glass melt by heating a starting material to melt while maintaining an Fe content in the starting material at a constant level so that an amount of variation in the Fe ion content in the glass melt be kept to within ±50 percent;
manufacturing multiple pieces of a disklike glass material by the successive molding of multiple pieces of disklike glass material from the glass melt, a sheet thickness of said pieces of disklike glass material varying within a range, wherein the Fe ion content in the disklike glass material ranges from 0.1 to 100 ppm and the molding of the glass melt into disklike glass materials comprises (1) controlling variation over time in the concentration of infrared radiation-absorbing ions contained in the glass melt being molded into said pieces of disklike glass material so that the variation in the sheet thickness of said multiple pieces of disklike glass material falls within a range of ±15 percent of a reference value, said reference value being the median between the maximum value and the minimum value of the sheet thickness of 1,000 pieces of said glass material, and (2) press molding the glass melt to obtain a disklike glass material;
forming a hole in a center of said disklike glass material;
processing the inner and outer perimeters thereof; and
grinding and/or polishing the main surfaces thereof to obtain an information recording medium-use glass substrate.

10. A method for manufacturing an information recording medium comprising the step of forming an information recording layer on a glass substrate obtained by the method according to claim 9.

11. A method for manufacturing information recording medium-use glass substrates, comprising:
preparing a glass melt by heating a starting material to melt while maintaining at least one of an Fe ion content and a Cr ion content in the starting material at a constant level so that an amount of variation in at least one of the Fe ion content and the Cr ion content in the glass melt is kept to within ±50 percent;

manufacturing multiple pieces of a disklike glass material by the successive molding of multiple pieces of disklike glass material from the glass melt, a sheet thickness of said pieces of disklike glass material varying within a range, wherein in the course of molding multiple pieces of disklike glass material comprised of glass containing 0.1 to 100 ppm of at least one infrared radiation-absorbing ion of a metal selected from the group consisting of Fe, Cu and Cr, variation over time in the concentration of the infrared radiation-absorbing ions contained in the glass melt being molded into said pieces of disklike glass material is controlled to suppress variation in the sheet thickness of said multiple pieces of sheetlike glass material and the glass melt is press molded to obtain a disklike glass material;

forming a hole in a center of said disklike glass material; processing the inner and outer perimeters thereof; and grinding and/or polishing the main surfaces thereof to obtain an information recording medium-use glass substrate.

12. A method for manufacturing an information recording medium comprising the step of forming an information recording layer on a glass substrate obtained by the method according to claim 11.

\* \* \* \* \*

UNITED STATES PATENT AND TRADEMARK OFFICE
CERTIFICATE OF CORRECTION

PATENT NO.       : 8,656,734 B2                                              Page 1 of 1
APPLICATION NO.  : 12/522062
DATED            : February 25, 2014
INVENTOR(S)      : Zou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

Twenty-ninth Day of September, 2015

Michelle K. Lee
*Director of the United States Patent and Trademark Office*